United States Patent [19]
Betker et al.

[11] Patent Number: 5,909,557
[45] Date of Patent: *Jun. 1, 1999

[54] INTEGRATED CIRCUIT WITH PROGRAMMABLE BUS CONFIGURATION

[75] Inventors: Michael Richard Betker; Trevor Edward Little, both of Allentown, Pa.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/559,868

[22] Filed: Nov. 20, 1995

[51] Int. Cl.$^6$ ........................................................ G06F 13/00
[52] U.S. Cl. ............................ 395/284; 395/828; 395/830
[58] Field of Search .................................. 395/284, 828, 395/830, 307

[56] References Cited

U.S. PATENT DOCUMENTS

| | | | |
|---|---|---|---|
| 4,272,829 | 6/1981 | Schmidt et al. | 364/900 |
| 4,940,909 | 7/1990 | Mulder et al. | 326/38 |
| 5,175,831 | 12/1992 | Kumar | 395/830 |
| 5,185,516 | 2/1993 | Saito | 235/380 |
| 5,361,365 | 11/1994 | Hirano et al. | 395/775 |
| 5,371,892 | 12/1994 | Petersen et al. | 395/284 |
| 5,414,380 | 5/1995 | Floyd et al. | 327/198 |
| 5,428,748 | 6/1995 | Davidson et al. | 395/829 |
| 5,537,601 | 7/1996 | Kimura et al. | 395/800 |
| 5,594,874 | 1/1997 | Narayanan et al. | 395/284 |
| 5,623,687 | 4/1997 | Yishay et al. | 395/800 |
| 5,671,355 | 9/1997 | Collins | 395/200.8 |

FOREIGN PATENT DOCUMENTS

| | | | |
|---|---|---|---|
| 2 095 009 A | 9/1982 | European Pat. Off. | G06F 12/00 |
| 0 619 546 A1 | 10/1994 | European Pat. Off. | G06F 12/06 |

OTHER PUBLICATIONS

European Search Report.
"H8/3042 Series Hardware Mannal", published by Semiconductor and IC Div. Hitachi, Ltd., 1st Edition, Feb. 1994, pp. 6, & 55–61. Figure 1–2 shows dedicated mode pins $MD_0$, $MD_1$, $MD_2$. These pins are discussed on p. 55 for accessing data busses of either 8 or 16 bits width.
"M68HC11 Reference Manual", published by Motorola, Inc., Rev. 3, 1991, pp. 2–9—2–11 & 2–33—2–34.

Primary Examiner—Ayaz R. Sheikh
Assistant Examiner—Ario Etienne
Attorney, Agent, or Firm—James H. Fox

[57] ABSTRACT

A technique for configuring a processor allows the processor to interface with external buses of different types; for example, busses having different data widths. Configuration data is stored in a memory, typically a read-only memory, and transferred to the processor during a system configuration period. An initial configuration fetch may be accomplished to retrieve the configuration information prior to executing an actual processor instruction. Alternatively, the configuration information may be included in an actual instruction word. The system configuration period typically occurs during the initial power-on sequence, but may occur at other times.

32 Claims, 2 Drawing Sheets

INTEGRATED CIRCUIT WITH PROGRAMMABLE BUS CONFIGURATION

BACKGROUND OF THE INVENTION

1. Field of the Invention

This invention relates to programmably configuring an integrated circuit or use with a bus.

2. Description of the Prior Art

Integrated circuit (IC) processors, including for example microprocessors, microcontrollers, and digital signal processors, typically communicate addresses and data to and from external devices over multi-conductor uses. These buses typically include 8, 16, 32 or 64 conductors in the case of data uses, and perhaps 20 to 30 conductors in the case of address buses, depending on memory size. The number of conductors in a bus is referred to as the bus "width". In many cases, the data bus and the address bus are separate. In other cases, the addresses are time-multiplexed with the data on the same bus conductors. It is desirable in some cases for a processor to be able to interface with more than one bus width. For example, a microcontroller may interface with an 8-conductor data bus in a low-cost system, or may alternatively interface with a 16-conductor data bus in a higher-performance system. However, it is usually necessary to instruct the processor prior to system start-up as to what type of bus it must interface with, in order to avoid corrupted data and/or incorrect instructions that could lead to system failure.

Configuring the processor so as to interface with the chosen bus type has been accomplished using integrated circuit terminals that are connected to a high or low voltage source ($V_{DD}$ or $V_{SS}$). However, that technique typically requires extra integrated circuit terminals that serve no other function. It is also known that processors can be configured using external pull-up or pull-down resistors connected to terminals that serve a dual-use function. For example, the terminals may be sampled during an initial configuration period at system power-up, and then used as input or output terminals after the initial configuration period. However, that technique requires space for the configuration resistors on a printed circuit board. Such space is increasingly at a premium as fine pitch packages and various flip-chip technologies lead to finer conductor spacing. In addition, the use of external resistors may complicate in-board circuit testing, as via JTAG (IEEE Standard 1149.1), and results in power dissipation during system activity. It is known also to use an initial configuration period for setting the control signal modes; for example, active logic high or alternatively active logic low.

SUMMARY OF THE INVENTION

We have invented a technique for configuring an integrated circuit processor so as to interface with external buses of different types. Configuration data is stored in a memory, typically a non-volatile memory, and transferred to the processor during a configuration period. The configuration period typically occurs during the initial power-on sequence, but may occur at other times.

DETAILED DESCRIPTION

The following detailed description relates to a configurable processor and a system that includes the processor. During a configuration period, stored configuration data is transferred to the processor and used for configuring the processor to interface with a bus having a given bus width. The configuration data may be stored in a read-only memory (ROM), electrically erasable read only-memory (EEPROM), or various forms of programmable read-only memory (PROM), allowing it to be fetched upon initial power-up. The configuration data may alternatively be stored in a battery-backed CMOS memory, ferroelectric memory, or various forms of magnetic memory, for example. All such memories will be described as "non-volatile" herein, since they retain their stored information even after system power is removed. In many cases, the configuration memory is a component already required by other design considerations. Hence, no additional components may be required to implement the invention. In addition, no additional IC terminals ("pins") are typically required.

Figure 1:
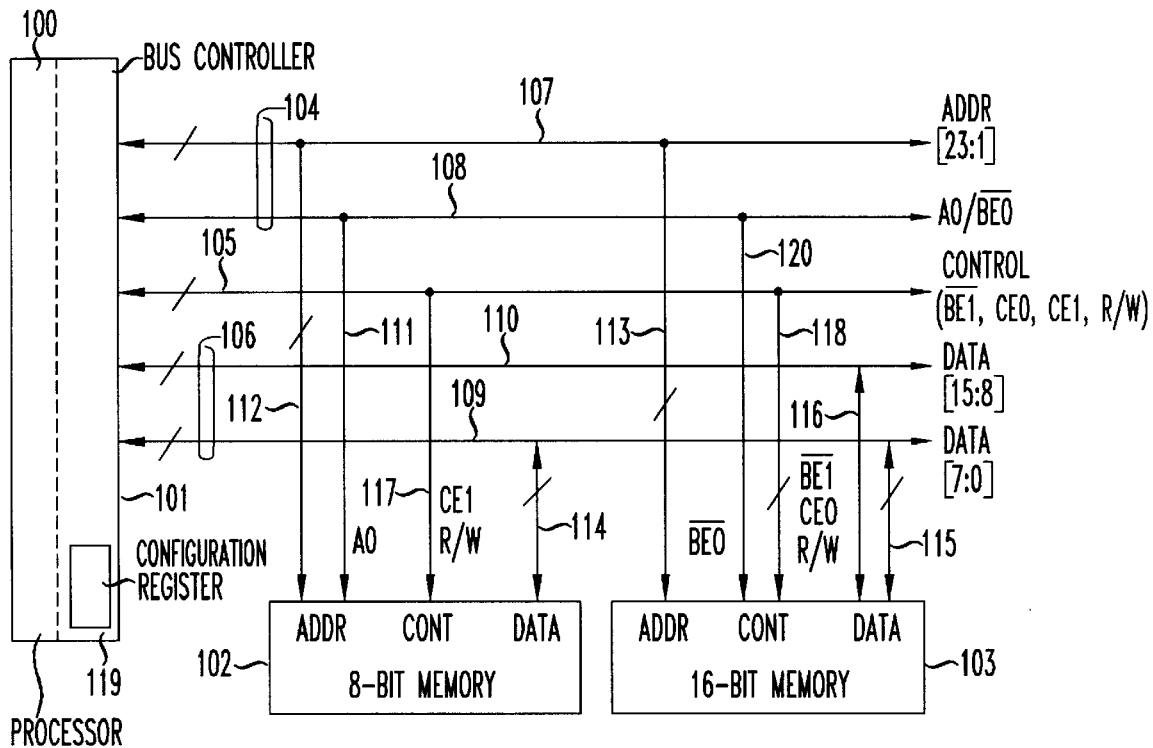
FIG. 1 shows an illustrative system that implements the inventive technique.

Referring to FIG. 1, an illustrative embodiment of the invention is shown. An integrated circuit includes a processor 100 that has a bus controller 101. The processor is connected to an 8-bit memory 102 and a 16 bit memory 103. The processor 100, being a microcontroller in this embodiment, includes 24 address terminals which connect to address bus 104, control terminals which connects to control lines 105, and 16 data terminals which connect to data bus 106. The address bus 104 includes a first portion 107 that includes address lines 23 to 1, and a second portion 108 that includes address line 0. The 8-bit memory 102 is connected to the lowest address line 108 (ADDR [0]) via line 111, and to at least some of the higher address lines in bus portion 107 via lines 112. The 16-bit memory 103 is connected to at least some of the higher address lines in bus portion 107 via lines 113, but not to line 108 (ADDR[0]). The data bus includes a first 8-bit portion 109 that includes data lines 0 to 7, and a second 8-bit portion 110 that includes data lines 8 to 15. The data input/output terminals of 8-bit memory 102 are connected to bus portion 109 via lines 114, and the data input/output terminals of 16-bit memory 103 are connected to bus portions 109 and 110 via lines 115 and 116, respectively. The control lines 117 and 118 supply a common read/write signal and separate chip enable signals to the memories 102 and 103, respectively. The bus controller uses the chip enable signal CE0 to select 16-bit memory 103 as the configuration memory in the illustrative case. However, the 8-bit memory 102 could be selected by CE1 as the configuration memory in an alternative embodiment. A control line in control bus 118 may also supply a "byte enable high" ($\overline{BE1}$) signal and address/control line 120 supplies a "byte enable low" ($\overline{BE0}$) signal to the 16-bit memory 103, to allow independent writes to the high and low order 8-bit sub-units.

An illustrative operational embodiment of the inventive technique will next be given, but with other operations and circuitry being possible. After system power-up (or alternatively system reset), the processor issues an initial fetch request of data; for example, four bytes. This fetch may be a dummy fetch where the returned values are subsequently discarded by the processor and not used as valid instructions. However, the bus controller 101, which is initially in 8-bit mode, breaks the transactions into 8-bit fetches, and uses at least one bit of the first byte read to change the bus-size setting in its configuration register 119. After the dummy fetch has completed, the processor will issue a true fetch to the reset vector location. This true fetch is then handled appropriately by the bus control logic, which is then in the correct 8 or 16 bit mode. The processor instructions are illustratively either 16 bits or 32 bits long, as indicated by the value of the least significant bit (bit 0) of the instruction. Many 16-bit instructions have 32-bit equivalents, so it is feasible to use the instruction size bit (bit 0) as the variable bit that specifies the required bus size. This implies that the "dummy" first fetch and second "true" fetch can be to the same memory address, simplifying the design.

More than one bit may be conveniently initialized by the inventive technique. This will be illustrated more fully by means of the following EXAMPLE:

EXAMPLE

Figure 2:
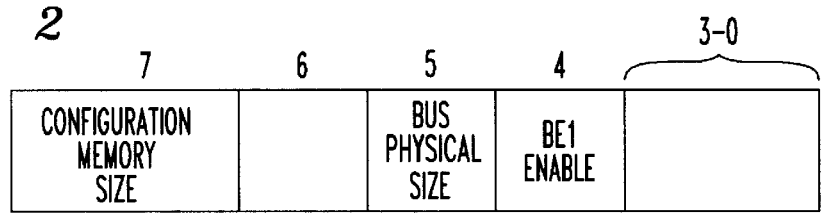
FIG. 2 shows configuration data embedded in an instruction word that may be used in implementing the inventive technique.

The configuration fetch uses 3 bits, all from the first byte (see FIG. 2) of the configuration fetch from address 0, as received from bus 109. Each of these bits corresponds to a bit in the configuration register 119, which is set to all "0's" prior to the configuration fetch (for example, at reset). The processor issues its first fetch after the configuration fetch to location 0X000000 (in hexadecimal notation), and begins executing instructions normally thereafter. Therefore, in this case, the configuration bits are part of a valid instruction at address 0. FIG. 2 shows the bits used to set the register 119, as follows:

Bit 7 determines the data width of the memory selected by CE0: 0=8 bits, 1=16 bits Bit 5 determines the physical size of the data bus: 0=8 bits, 1=16 bits.

Bit 4 determines whether a given IC terminal ($\overline{BE1}$/DATA OUT) is used as follows: 0=use the given terminal as a general purpose input/output; 1=use the given terminal as $\overline{BE1}$.

Note that when the physical bus is 8 bits, then the other 8 integrated circuit terminals may be used as general purpose input/output terminals. It will be apparent to persons of skill in the art that an 8-bit access may be accomplished on an 8-bit device in a single access, but that a 16-bit access requires two separate accesses of an 8-bit device.

As indicated above, the 3 bits are embedded in a valid instruction word. In the illustrative case, this is a 16 bit "jump if true" instruction, wherein the above-noted bits 4, 5 and 7 are embedded in the displacement field. However, at reset the jump condition flag in the program status word is cleared, so that the jump is not actually taken. If it is desired to initialize even more bits in the first fetch than shown above, then the dummy fetch may be to a pre-defined location other than the reset vector address. Therefore, the bits fetched by the dummy fetch need not be part of an actual instruction word. This allows many additional control register bits to be initialized at start-up. Also, while the configuration period noted above typically occurs during a system power-up period, other times are possible. For example, inserting a plug-in circuit card having a given bus width may trigger the configuration period, thereby allowing the system to interface with circuit cards having differing bus widths.

Figure 3:
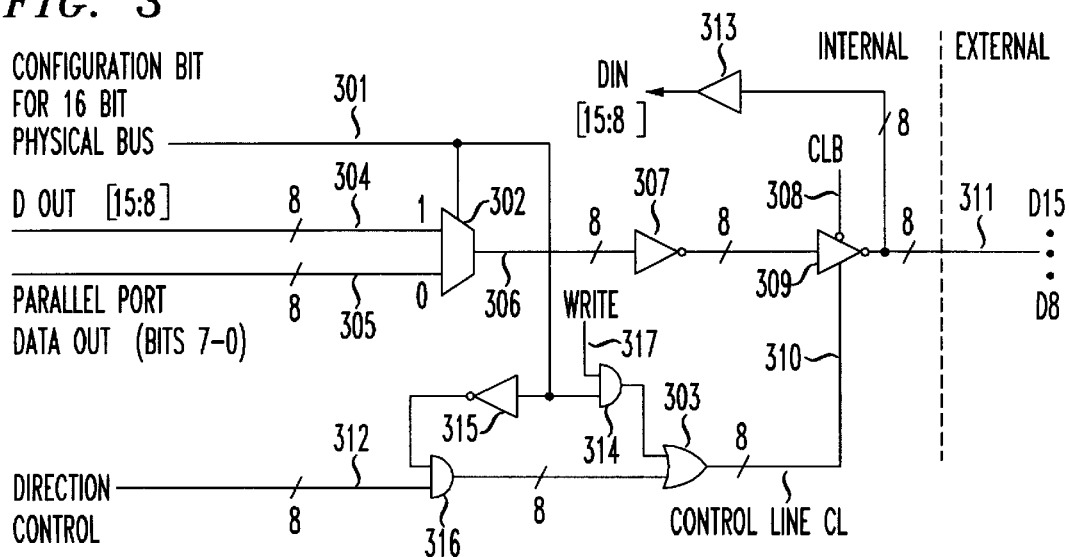
FIGS. 3 to 5 show embodiments of circuitry that may be used in implementing the inventive technique.

Circuitry that may be used in the bus controller for configuring the processor for use with a given physical bus size (e.g., 8 or 16 conductors) is shown in FIG. 3. The logic gates shown are illustrative single units in the multi-conductor bus, and will be referred to in the singular. The conductors will be referred to as single lines or busses as appropriate. This circuitry selects whether 8 integrated circuit terminals ("pins") are used as general purpose input/output pins, or alternatively as part of the data bus shown in FIG. 1. The bus size configuration bit (bit 5 in the above example) is applied to line 301, which is connected to the control input of the multiplexer 302 and an input to OR gate 303. When the bus size configuration bit is "1", line 301 is high, selecting internal bus 304 for connection to multiplexed output bus 306, inverter 307, three-state output buffer 309, and external bus conductor 311. When line 301 is high, and write line 317 is activated (high), the output of AND gate 314 is high. Therefore, the output of OR gate 303 is high, placing a high voltage on output buffer control line CL 310, and hence a low voltage on complementary control line CLB 308, thereby enabling output buffer 309. When the bus size configuration bit is "0", line 301 is low, selecting parallel port data (bits 7–0) on line 305 to be applied to the external bus 311.

The direction of data flow (input or output) for each parallel port bit in FIG. 3 is determined by which conductor on bus 312 is high, as follows: When line 301 is low, the output of inverter 315 is high, allowing the voltage on a given direction control conductor 312 to pass through AND gate 316 and control the voltage on a conductor of bus 310. A high conductor on bus 310 activates the corresponding buffer 309, thereby driving the corresponding external bus conductor 311 as an output. A low conductor on bus 310 places the corresponding buffer 309 in a high output impedance state ("tri-state"), thereby allowing the corresponding external bus conductor 311 to serve as an input, through input buffer 313.

The above has described configuration of the processor to interface with data busses of differing widths. However, other controller circuitry may be included for controlling the configuration of the address bus. For example, it is known in the memory art to use a "byte enable" (BE) signal to address a given byte in a memory having a data width of two or more bytes. For example, a $\overline{BE0}$ signal may be used to address the lower byte in a memory having 16 data lines ("16 bit memory"). Similarly, a $\overline{BE1}$ signal may be used to address the upper byte. The use of these signals is under the control of the bits 4 and 7 in the above example, and the control circuitry may be implemented with multiplexers in a manner analogous to the circuitry of FIG. 3. The address bus then supplies 23 address bits A[23:1], with $\overline{BE1}$ and $\overline{BE0}$ being supplied by separate conductors (e.g., 105, 108) in the illustrative 24 conductor case. On the other hand, in other memory types, for example a memory that has 8 data lines ("8 bit memory"), all of the address bus conductors (107, 108) supply address bits; i.e., A[23:0] in the illustrative 24 bit address bus.

Figure 4:
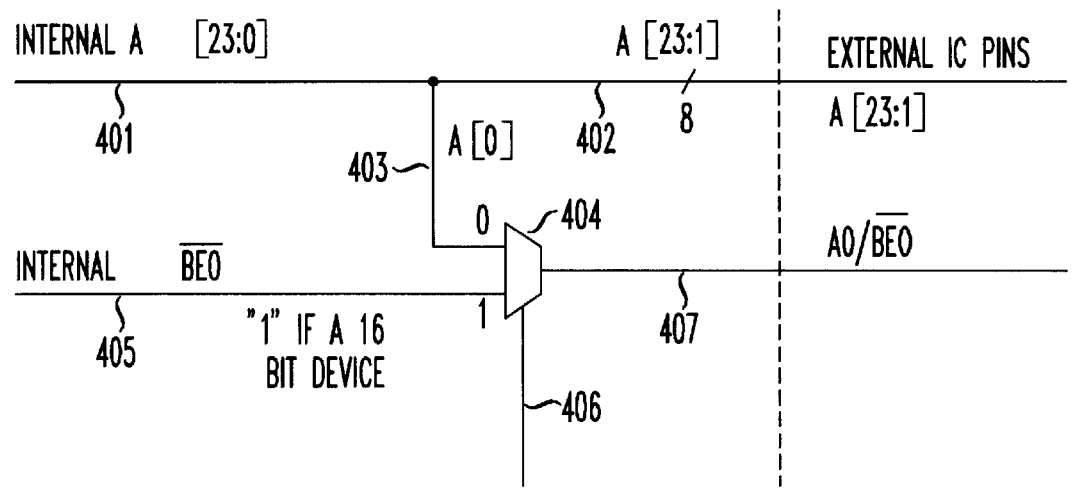

A circuit suitable for selecting whether A0 (address 0) or $\overline{BE0}$ is supplied to a memory is shown in FIG. 4. The internal address bus 401, carrying address bits A[23:0], is split into address bus 402 supplying address bits A[23:1] and address line 403 carrying bit A[0]. The line 403 is connected to an input of multiplexer 404. The internal $\overline{BE0}$ signal on line 405 is connected to the other input of multiplexer 404. Multiplexer 404 is controlled by line 406, which is "0" if an 8 bit memory is being accessed, or "1" if a 16 bit memory is being accessed, connecting either A[0] or alternatively $\overline{BE0}$ to line 407, respectively.

Figure 5:
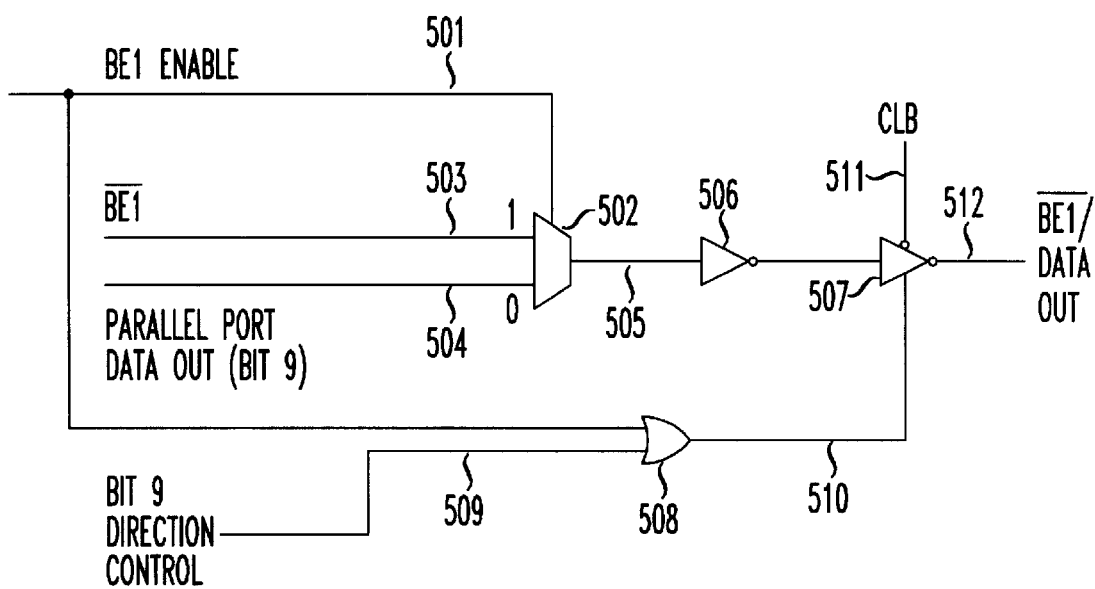

A circuit suitable for selecting whether $\overline{BE1}$ is supplied is shown in FIG. 5. The BE1 enable signal on line 501 is used to control multiplexer 502 that receives the $\overline{BE1}$ signal on input line 503, and a data out signal on input line 504. The multiplexer output line 505 supplies the selected signal to inverter 506 and tri-state output buffer 507. The $\overline{BE1}$ enable signal is also supplied to an input of OR gate 508, which receives a "bit 9" direction control signal on line 509. Therefore, when BE1 enable is asserted high ("1"), the OR gate 508 places a high signal on buffer control line 510. In addition, complementary (low) signal is placed on buffer control line 511, so that tri-state buffer 507 is enabled to drive the $\overline{BE1}$ signal onto line 512. When the BE1 enable signal is low ("0"), the parallel port data out signal on line 504 is selected by multiplexer 502 and hence supplied to tri-state buffer 507. The buffer 507 is then controlled by the bit 9 direction control signal on line 509 connected to an input of OR gate 508. When line 509 is high, line 510 is high (and line 511 low) as before, so that the data out signal may be driven onto line 512 by buffer 507. Note that when the bit 9 direction control signal on line 509 is low ("0"), then OR gate 508 places a low signal on buffer control line 510 (and a complementary high signal is supplied to line 511), so that the buffer 507 assumes the high impedance output condition. This allows line 512 to serve as in input line to other devices (not shown) on the integrated circuit.

The illustrative circuitry of FIGS. 3, 4 and 5 show how IC terminals may be used for dual purposes with the inventive technique. However, a variety of other logic circuitry may be used in implementing these functions. Note also that while the above embodiment has been given in terms of separate address and data busses, the present technique may be applied to multiplexed address/data busses, as will be apparent to persons of skill in the art. In addition to the configuration of the data and address busses shown above, the present invention may be used for still other configuration purposes. For example, the polarity (active high or active low) of the address lines, control lines, and/or data lines may be set by the inventive technique. The control signal modes may also be set; for example, whether read/write and chip select signals are used as when interfacing with Motorola type microprocessors, or alternatively whether read and write signals are used, as when interfacing with Intel type microprocessors. Any or all of these may be configured in addition to, or in lieu of, the data and address busses indicated above. All such parameters are considered to be "configuration information" that may be used for configuring an integrated circuit by the inventive technique.

While a variety of configurations may be performed by the inventive technique, the data in the configuration memory itself should be in a form that is useable by the bus controller during the configuration period. After the configuration period disclosed herein, the processor in the integrated circuit is configured for normal operation with respect to communicating with one or more of the external busses. Thereafter, other configurations may be accomplished, as for example what are typically referred to as "boot sequences" by workers in the art.

The invention claimed is:

1. An integrated circuit comprising a processor and a given number of terminals which may be configured for communicating with a selected type of external bus,
    characterized in that said integrated circuit further comprises a bus controller for supplying an initial address to an external memory over said external bus during a bus configuration period, and fetching bus configuration information from said external memory over said external bus, with said fetching utilizing a fewer number of terminals than said given number, and configuring said integrated circuit so that said processor can communicate data over said external bus;
    wherein said controller fetches said bus configuration information during an initial fetch that does not result in an instruction being executed by said processor.

2. The invention of claim 1 wherein said memory is a non-volatile memory.

3. The invention of claim 1 wherein said bus configuration period results from the power-up of said integrated circuit.

4. The invention of claim 1 wherein said bus configuration period results from the reset of said integrated circuit.

5. The invention of claim 1 wherein said configuring includes selecting the number of data terminals with which said integrated circuit communicates with said bus.

6. The invention of claim 1 wherein said configuring includes selecting the number of address bits with which said integrated circuit communicates with said bus.

7. The invention of claim 1 wherein said terminals comprise multiplexed address/data terminals.

8. The invention of claim 1 wherein said terminals comprise separate address terminals and data terminals.

9. An integrated circuit comprising a processor and a given number of terminals which may be configured for communicating with a selected type of external bus,
    characterized in that said integrated circuit further comprises a bus controller for supplying an initial address to an external memory over said external bus during a bus configuration period, and fetching bus configuration information from said external memory over said external bus, with said fetching utilizing a fewer number of terminals than said given number, and configuring said integrated circuit so that said processor can communicate data over said external bus;
    wherein said controller fetches said bus configuration information during an initial fetch that also fetches an instruction word that is executed by said processor.

10. The invention of claim 9 wherein said memory is a non-volatile memory.

11. The invention of claim 9 wherein said bus configuration period results from the power-up of said integrated circuit.

12. The invention of claim 9 wherein said bus configuration period faults from the reset of said integrated circuit.

13. The invention of claim 9 wherein said configuring includes selecting the number of data terminals with which said integrated circuit communicates with said bus.

14. The invention of claim 9 wherein said configuring includes selecting the number of address bits with which said integrated circuit communicates with said bus.

15. The invention of claim 9 wherein said terminals comprise multiplexed address/data terminals.

16. The invention of claim 9 wherein said terminals comprise separate address terminals and data terminals.

17. A method of configuring an integrated circuit comprising a processor and a given number of terminals which may be configured for communicating with a selected type of external bus,
    characterized by supplying an initial address to an external memory over said external bus and fetching bus configuration information from said external memory over said external bus during a bus configuration period, with said fetching utilizing a fewer number of terminals than said given number, and configuring said integrated circuit so that said processor can communicate data over said bus;
    wherein said fetching fetches said bus configuration information during an initial fetch that does not result in an instruction being executed by said processor.

18. The invention of claim 17 wherein said memory is a non-volatile memory.

19. The invention of claim 17 wherein said bus configuration period results from the power-up of said integrated circuit.

20. The invention of claim 17 wherein said bus configuration period results from the reset of said integrated circuit.

21. The invention of claim 17 wherein said configuring includes selecting the number of data terminals with which said integrated circuit communicates with said bus.

22. The invention of claim 17 wherein said configuring includes selecting the number of address bits with which said integrate circuit communicates with said bus.

23. The invention of claim 17 wherein said terminals comprise multiplexed address/data terminals.

24. The invention of claim 17 wherein said terminals comprise separate address terminals and data terminals.

25. A method of configuring an integrated circuit comprising a processor and a given number of terminals which may be configured for communicating with a selected type of external bus, characterized by supplying an initial address to an external memory over said external bus and fetching bus configuration information from said external memory over said external bus during a bus configuration period, with said fetching utilizing a fewer number of terminals than said given number, and configuring said integrated circuit so that said processor can communicate data over said bus;

wherein said fetching fetches said bus configuration information during an initial fetch that also fetches an instruction word that is executed by said processor.

26. The invention of claim 25 wherein said memory is a non-volatile memory.

27. The invention of claim 25 wherein said bus configuration period results from the power-up of said integrated circuit.

28. The invention of claim 25 wherein said bus configuration period results from the reset of said integrated circuit.

29. The invention of claim 25 wherein said configuring includes selecting the number of data terminals with which said integrated circuit communicates with said bus.

30. The invention of claim 25 wherein said configuring includes selecting the number of address bits with which said integrated circuit communicates with said bus.

31. The invention of claim 25 wherein said terminals comprise multiplexed address/data terminals.

32. The invention of claim 25 wherein said terminals comprise separate address terminals and data terminals.

\* \* \* \* \*